June 12, 1934.                A. HADDOCK                 1,962,441
                ACOUSTIC CINEMATOGRAPHIC APPARATUS
                       Filed July 8, 1930         2 Sheets-Sheet 2

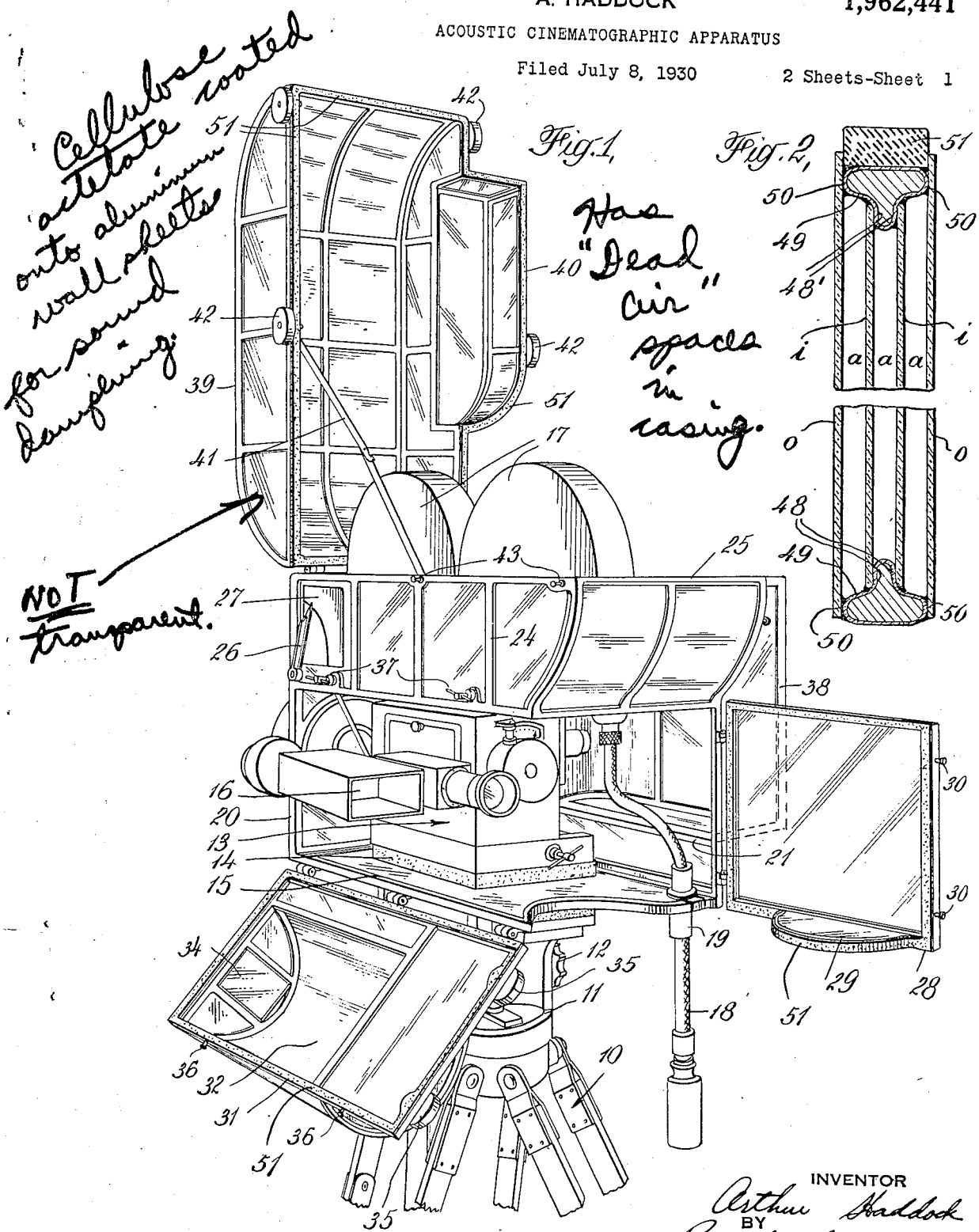
June 12, 1934.     A. HADDOCK     1,962,441
ACOUSTIC CINEMATOGRAPHIC APPARATUS
Filed July 8, 1930     2 Sheets-Sheet 1

INVENTOR
Arthur Haddock
BY
ATTORNEYS

Patented June 12, 1934

1,962,441

UNITED STATES PATENT OFFICE 1,962,441

ACOUSTIC-CINEMATOGRAPHIC APPARATUS

Arthur Haddock, Hollywood, Calif., assignor to Warner Bros. Pictures, Inc., New York, N. Y., a corporation of Delaware Application July 8, 1930, Serial No. 466,483

12 Claims. (Cl. 88—16.2)

This invention relates to acoustic-cinematographic apparatus, and has for its object the provision of a sound-proof enclosure for the camera or other undesirably noisy operating instruments employed in the course of photographing or recording the action or picture record and the sound record, which records when finally assembled in the usual ways may be employed for the production of talking motion pictures.

Inasmuch as the microphone or other electrical "pick-up", so-called, which responds to the sounds which are sought to be recorded is also sensitive to extraneous noises, it is desirable to eliminate these undesired noises to the greatest extent possible in order that the talking or musical sound record will reproduce only the intended sounds. The operation of a motion picture camera which is used to photograph or record the visual subject-matter or action is usually accompanied by the whirring and clicking noises of the film-feeding and intermittent film driving or advancing mechanism which, if permitted to reach the microphone which is usually located near the camera and the performer, will be recorded and superimposed upon the desired sound record and will be reproduced upon the showing of the completed picture with its accompanying sound record.

Attempts have been made heretofore to solve this problem by providing large and heavy sound-proof housings for the camera and a support therefor, and having hand holes in such housing for permitting the frequent and necessary adjustments of the instrument, or by providing sufficiently large and heavy sound-proof booths for accommodating the camera with a tripod or other support and one or more camera operators. These arrangements have been found to be fairly satisfactory for use in studios where the arrangements are such that it is not necessary to frequently move the housing with its enclosed camera over considerable distances, but on location such as when recording outdoor sound pictures and in certain cases in the larger studios where it is necessary to frequently shift the position of the camera, the services of a number of men or the use of a crane or other mechanical apparatus has been necessary to move these large and heavy booths or housings around to the proper positions.

Inasmuch as this method of procedure, involving as it does the moving and shifting of heavy housings or booths, has proven to be cumbersome, has consumed much time and has required labor or mechanism, it was not resorted to as frequently perhaps as it should have been, whereby the movements of the actors were limited to a small area, or the photographic recording was frequently below existing standards, because of the inability of the camera operators to secure easy and quick mobility of their instruments.

It is the principal object of this invention to provide a sound-proof enclosure for the camera, or other noisily operating instrument employed in recording the component subject-matter of talking motion pictures, which confines the undesirable noises produced by the camera or other instrument within the enclosure (or prevents the radiation of sound therefrom), and which may be mounted upon a tripod or other similar support so that it may be readily carried with the instrument enclosed thereby by one man, and to form the camera or other undesirably noisy instrument a compact and easily portable unit.

A further object of this invention is to provide a substantially air-tight, sound-proof enclosure having a semi-hard, non-metallic, substantially non-elastic surface which neither reflects nor transmits sonic vibrations, and which at the same time damps the natural or forced vibration of the frame of the enclosure.

These and other objects of this invention are accomplished in a preferred embodiment of the invention as applied to a motion picture camera or other instrument particularly adapted for use in recording the subject-matter of talking motion pictures, and comprises a light skeleton frame, preferably of cast aluminum or an alloy thereof, trussed for strength, mounted upon the tripod or other support which carries the instrument and completely enclosing the latter. The frame is so constructed as to be substantially air-tight, foldable in part and having apertures adapted to be normally closed but easily opened for access to the instrument enclosed thereby.

The frame, like practically all rigid bodies, responds to and will conduct or transmit sonic vibrations, but the natural period of vibration thereof as well as its tendency to transmit, conduct or sustain sonic vibrations of other frequencies is damped by means of a covering or coating of non-elastic material which, in accordance with the preferred arrangement, consists of a material possessing, when first applied, a fluidity or plasticity.

The skeleton frame of the enclosure is preferably coated with a solution of cellulose acetate in acetone, and its openings sealed with sheets of cellulose acetate, a number of the latter being arranged in spaced relation so as to provide a plurality of dead air spaces within the walls formed thereby. With this construction, the instrument and its enclosure constitute a comparatively light and readily portable and thoroughly sound-proof, substantially air-tight device, which has all of the sound-proofing advantages but none of the objectionable features of the heavy and cumbersome enclosures heretofore employed.

I have discovered that, if the enclosure is made substantially air-tight at the contacting portions of the folding parts by means of the use of sponge rubber strips of fine texture, and if the openings are similarly provided with sponge rubber gaskets, there is no leakage of air which would give rise to the transmission of air pulses induced by the noises accompanying the operation of the camera mechanism. Unless precautions are taken to make the enclosure substantially air-tight, as just stated, air leakage will occur, whereby pulses corresponding to the noises produced by the operating mechanism wil be set up in the air leakage path and will result in the production of noises in the air surrounding the enclosure.

For a better understanding of the invention, reference is made to the accompanying drawings, in which:

Figure 1 is a perspective view of the sound-proof enclosure of this invention, seen in an open or unfolded position;

Figure 2 is an enlarged cross-section of a wall of the enclosure; and

Figure 3:
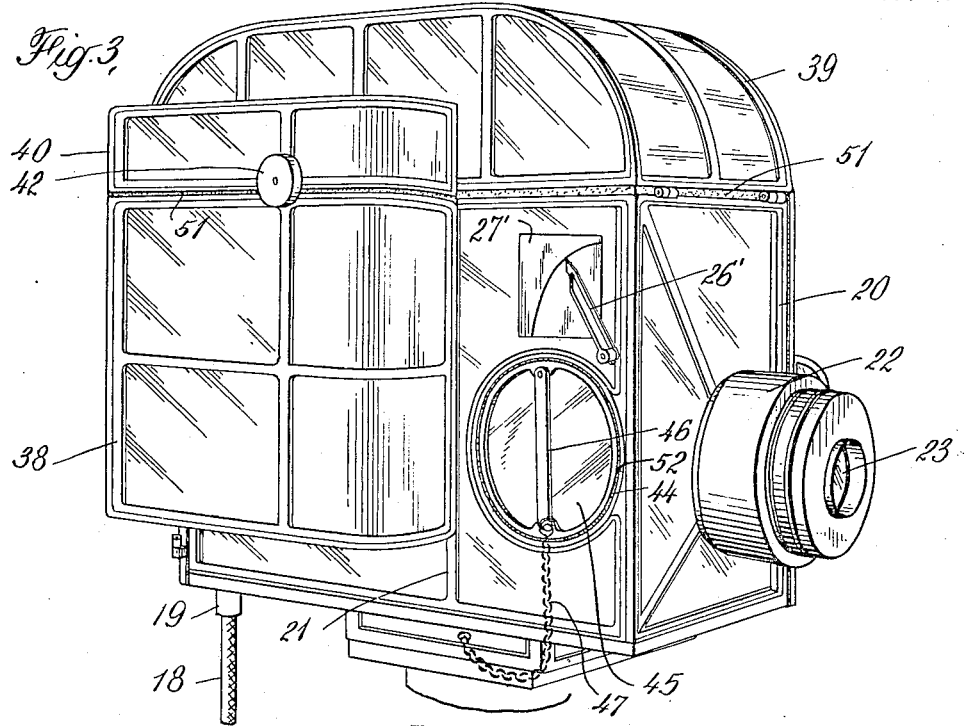
Figures 3 and 4 are perspective front and side and rear and side views of the enclosure in folded or closed position.

In these drawings, numeral 10 designates the usual portable camera tripod having the swivel 11, which is normally rotatable about a vertical axis and which may be rotated about a horizontal axis at will by adjustment of the hand wheel 12. Mounted on the swivel 11 is the camera 13 or other instrument, and clamped between the base of camera 13 and the top of swivel 11, between vibration dampening cushions 14 of rubber, felt, or the like, is a frame-work 15, preferably formed of cast aluminum, an alloy of aluminum, or other light material. The camera 13 comprises the usual construction common to motion picture cameras, and is equipped at one side with a view-finder 16 and the focusing mechanism, and at the top with the film magazines 17. The flexible shaft 18 entering the enclosure at 19 is adapted to be driven by an electric motor for actuating the camera mechanism in synchronism with the sound recording apparatus not shown.

Mounted on the front edge of the frame 15 are vertical frames 20 and 21, respectively, these frames being also preferably formed of cast aluminum or other light material, and provided with diagonals and ribs so as to form strong and rigid truss-like skeleton frames while preserving lightness with a minimum amount of metal, as is the case of the frame 15.

Front frame 20 is provided with a circular projection 22, having an opening therein covered by optical glass 23, which registers with the lens of the camera 13.

Extending rearwardly from the top of front frame 20 is a truss-like aluminum side sub-frame 24, which is connected at its rear end with another truss-like aluminum rear sub-frame 25, extending from side frame 21, these two sub-frames 24 and 25 cooperating with the top portions of front and side frames 20 and 21 to form an enclosure for the lower portion of film magazines 17.

Hinged to the rear edge of side frame 21 is a door 28 consisting of an open aluminum frame and provided at its lower edge with a projection 29, which is adapted to fit into a notch formed in the frame 15 in order to close the same, this notch being provided so that the camera man may place his head in close proximity to the focusing glass for adjusting the camera to proper focus by the adjusting arm 26. The free vertical edge of rear door 28 is provided with a pair of locking pins 30, whose function will be described later.

Figure 4:
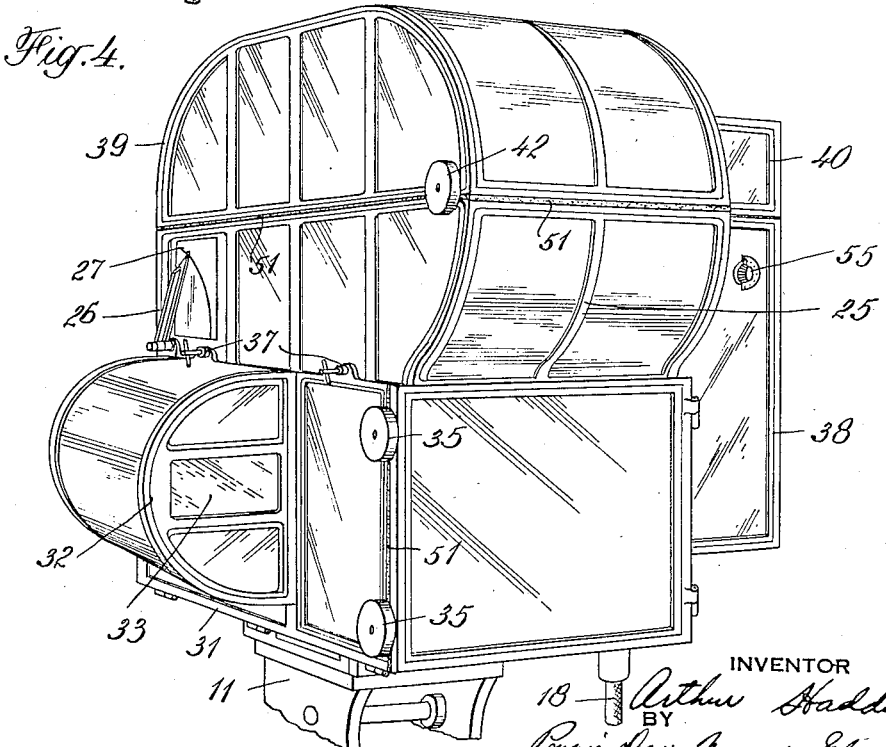

Hinged for movement about a horizontal axis along the free side edge of bed plate 15 is a truss-like aluminum side frame 31 which is provided with a semi-cylindrical extension 32, as shown particularly in Figure 4, this extension 32 serving to house the view-finder 16, and provided at its rear end with an eye-glass 33, through which the camera man may sight into the view-finder 16. The opposite end of extension 32 is provided with a similar glass 34, which, when the side frame 31 is raised into its closed position, registers with the object lens of view-finder 16. The rear edge of side frame 31 is provided with a pair of thumb screws 35, which are adapted to engage locking pins 30 of rear door 28 in order to lock this door in closed position in the manner shown in Fig. 4. Similarly, the top edge of side frame 31 is fitted with a pair of locking pins 36, which are adapted to be engaged by thumb screws 37 provided at the lower edge of side frame 24 for the purpose of locking side frame 31 in closed position, as shown in Fig. 4. Side frame 21 is provided with an extension 38 as shown in Fig. 3, this extension 38, like the side frame 21, being trussed and ribbed for purposes of strength but being an open skeleton frame like the other frames constituting the enclosure.

Hinged to the front frame 20 is a truss-like top frame 39, which is dish-shaped to cover the upper halves of film magazines 17, and is provided with an extension 40 adapted to register with extension 38 of side frame 21. This cover frame 39 may be held in raised or vertical position by knee latch 41, shown in Fig. 1, and is provided with a number of thumb screws 42 which are adapted to engage locking pins 43 secured to the upper edges of the side frames, whereby this top frame 39 is held in closed position.

Side frame 21 is provided with a ring 44, preferably cast integrally with said side frame 21, which serves as a hand hole and is normally closed by a cover plate 45, which fits with a friction fit therein provided by soft or sponge rubber surfaces, and is provided with a handle 46 for ready removal, and a chain 47 so that it will not become detached from the apparatus when removed from the hand hole 44 for purposes of adjusting the camera.

The inner edges of the members constituting the open frames are each provided with a bead 48 as shown in Fig. 2, the enlarged section thereof representing a cross-section of one of the walls of the enclosure.

The metallic aluminum or aluminum alloy, of which the elements forming the frame of the enclosure are formed, is resonant and will respond to the vibrations induced by the clicking of the film-feeding and intermittent advancing mechanism of the camera, and the hum of the flexible shaft 18 and other moving parts, by means of which the film and shutter of the camera are driven. In order to render the metallic aluminum unresponsive to vibrations of either its natural period or to vibrations corresponding to sounds of other frequencies, whereby the noises of the camera are not transmitted through the frame of the housing, each of the frames is coated with a layer or layers of non-elastic sound dampening material as shown at 49 in Fig. 2.

It is preferred that this non-elastic coating material be cellulose acetate which, according to the preferred process, is first dissolved in a suitable solvent such as acetone, and the several frames are alternately and successively dipped in this solution and exposed to the air a number of times until a coating of cellulose acetate attains a thickness of approximately one thirty-second of an inch.

The cellulose acetate coating damps not only the natural period of vibration of the frame but also makes it substantially non-conducting to vibrations corresponding to sounds of different frequencies, so that it is a poor conductor of sound and does not respond to or transmit vibrations of the frequencies to which it is subjected in use. Although I prefer to use cellulose acetate because it is convenient, effective and substantially fireproof, and forms a durable, semi-hard finish, I do not limit myself to the use of this material but may use any similar material which tends to damp or so affect the vibration or sonic conductivity of the enclosure frame when it is provided with such a coating.

The openings in the skeleton frame of the enclosure are fitted with sheets of non-resonant material, and here again I prefer to use sheets of cellulose acetate because of its convenience, ready handling, and substantially fireproof qualities, and I cut these sheets in the proper sizes to fit into the various openings in the skeleton frame. By means of some suitable solvent, such as acetone, I moisten the edges of the cellulose acetate sheets and/or the surfaces of beads 48 of the frame and lay the cellulose acetate sheets so that the edges engage the beads 48 of the frames, whereby the sheets are cemented thereto because of the softening action of the solvent. As shown in Fig. 2, I have designated these sheets $i$. Similarly, I cut additional sheets of cellulose acetate to contact the edges 50 of each of the frames, and, as before, I moisten the ends of the sheets $o$ and/or the corresponding surfaces of the frame 28, and cement the outer sheets $o$ thereto.

After these individual frames have been formed in this manner, whereby each frame includes four walls, $i$, $i$ and $o$, $o$, which form three dead air spaces $a$, these several frames may be secured together by any suitable means in the manner shown particularly in Fig. 1, but I prefer to cement them together by means of a solution of cellulose acetate, simply by moistening the engaging edges of the engaging frames by a suitable solvent, such as acetone, in order to soften the cellulose acetate coating before placing the frames together. More particularly, front and side frames 20 and 21 are cemented to the frame 15, sub-frames 24 and 25 are respectively cemented to front and side frames 20 and 21 and are then cemented together, while rear frame 28 and side frame 31 are secured to frame-work 15 by hinges and top frame 39 is secured to the top edge of front frame 20 by hinges.

As pointed out hereinbefore, sponge rubber strips 51 are affixed to the edges of the folding portions of the enclosure so that, when it is in the closed position, it is rendered substantially air-tight. A sponge rubber gasket 52 is provided for the cover plate 45 for a similar purpose.

The entire enclosure so formed is completely coated with cellulose acetate, or completed by sponge rubber contact strips, and the transparent sheets of cellulose acetate $i$, $o$, lend a window-like appearance to the entire enclosure, whereby the camera 13 and other portions of the mechanism may be seen. When the enclosure is closed as shown in Figs. 3 and 4, the camera and its mechanism are completely housed within this sound-proof enclosure, so that the noise of the camera therein does not penetrate beyond the confines of the enclosure.

The enclosure adds only approximately 25 lbs. to the usual weight of the camera and its tripod, so that they are readily portable and may be carried in the usual way.

The focus of the lens may be adjusted through the hand hole 44 which is normally closed by the cover 45 as shown in Fig. 3, while the camera may be sighted by the operator through the view-finder 16, which is visible through the eye-glass 33 at the rear of the enclosure as shown in Fig. 4.

Although the sound-proof enclosure of this invention has been described particularly with reference to a motion picture camera, it is to be understood that it is not limited thereto but may be used to enclose other sound sensitive or sound producing instruments, and that it lies within the scope of the invention to employ an enclosure constructed in the manner described herein for the purposes of sound-proofing other types of instruments which are undesirably noisy in operation.

What I claim is:

1. In acoustic-cinematographic apparatus, the combination of a portable motion picture camera which produces undesirable noises in the course of its normal operation, a sound-proof enclosure therefor provided with an aperture closed with optical glass to permit a cinematographic record of the action to be made by the camera, and comprising a skeleton frame-work to which a coating of sound-dampening material has been applied, a plurality of panels of sound-proof material covering the openings in said skeleton frame and a portable common support for said camera and said enclosure, whereby the camera, the enclosure and the support are easily and readily portable as a unit.

2. In acoustic-cinematographic apparatus, a sound-proof enclosure for motion picture cameras and the like, which in the course of normal operation are undesirably noisy, comprising an open skeleton metal frame-work coated with a semi-hard initially plastic material for damping vibrations thereof produced as a result of the said noisy operation, and a plurality of panels of sound-proof material covering the openings in the said frame.

3. In acoustic-cinematographic apparatus, a sound-proof enclosure for motion picture cameras and the like, which in the course of normal operation are undesirably noisy, comprising a metal frame-work having a plurality of openings, said frame-work being provided with a coating adapted to damp vibrations produced in said frame-work as a result of said noisy operation, and a plurality of sheets of sound-proof material secured in spaced relation in each of the openings of said frame-work to form a plurality of dead air spaces in the walls of the enclosure.

4. In an acoustic cinematographic apparatus, the combination of a portable cine camera and a container therefor comprising a metal skeleton frame, a layer of sound-deadening material thereover, and sound insulating panels in the openings in said skeleton frame comprising a plurality of alternate sheets of composition and air spaces.

5. A sound insulated container for a motion picture camera comprising a skeleton frame having a plurality of hinged members, one thereof being hinged in a horizontal plane over the top of the camera, another thereof being hinged in a horizontal plane at the side of the camera, and a third being hinged in a vertical plane at the back of the camera, said respective hinged members each comprising an open metal frame-work having openings therein and having a coating of non-resonant sound-deadening material thereover, a plurality of sheets of non-resonant members and means for attaching a plurality of said sheets in spaced relation to cover the openings in each of said frameworks and to provide a plurality of air spaces between the innermost sheet and the outermost sheet and means providing an optical path through said container for the camera.

6. In a sound-proof casing for a camera, a wall member comprising a metallic frame having at least three spaced sheet receiving surfaces, sheets of sound-proof material therefor, and means for uniting said sheets to said surfaces respectively.

7. In a sound-proof casing for a camera, a wall member comprising a metallic frame coated with cellulose material and having at least three spaced sheet receiving surfaces, and a sheet of cellulose material for each of said surfaces and integrally united with said coating.

8. A sound-proof casing for a camera adapted to be supported by a tripod and adapted to support and contain the camera, said casing having an optical aperture for the camera and comprising a wall member comprising a plurality of metallic frames coated with cellulose material, each of said frames having a plurality of sheets of cellulose material thereon integrally united with said coating, and cellulose material for integrally uniting adjacent frames.

9. A sound-proof casing for a camera comprising a base member, opposing sound-proof parallel walls extending substantially to the top of said casing and vertically arising therefrom, an off-set portion in one of said walls to accommodate the viewfinder of the camera, glass windows at opposite ends of said off-set portion, an off-set portion in the other of said walls to accommodate the motor for said camera, particularly when said camera is laterally shifted for focussing purposes, a top for said walls permitting said lateral motion of the film magazines and permitting the removal thereof through the top of said casing, and one of said walls having a photographic aperture for the camera.

10. A motion picture camera casing adapted to be supported by a tripod and adapted to support and contain the camera, said casing having a photographic aperture for the camera and comprising a plurality of movable sections permitting access to the camera and its film magazines, one of said sections comprising a metallic frame member having an opening, sound deadening material on said frame member and a plurality of spaced sheets of non-metallic material fixed to said frame member and covering said opening and providing air spaces between said sheets.

11. A motion picture camera casing adapted to be supported by a tripod and adapted to support and contain the camera, said casing having a photographic aperture for the camera and comprising a plurality of movable sections permitting access to the camera and its film magazines, one of said sections comprising a plurality of metallic frames having frame openings, means comprising non-metallic material between the edges of adjacent frames for retaining said frames in position, and sound deadening material for covering said frame openings.

12. A motion picture camera casing adapted to be supported by a tripod and adapted to support and contain the camera, said casing having a photographic aperture for the camera and comprising a plurality of movable sections permitting access to the camera and its film magazines, one of said sections comprising a plurality of metallic frames, having frame openings, means comprising non-metallic material between the edges of adjacent frames for retaining said frames in position, and sound deadening material for covering said frame openings, comprising a plurality of spaced non-metallic sheets fixed to each of said frames and forming air spaces.

ARTHUR HADDOCK.